United States Patent
Bennett et al.

(10) Patent No.: US 9,250,097 B2
(45) Date of Patent: Feb. 2, 2016

(54) COUPLED GPS PHONE AND NAVIGATION SYSTEM

(75) Inventors: James D. Bennett, Hroznetin (CZ);
Jeyhan Karaoguz, Irvine, CA (US);
Jeffrey D. Wheeler, Dana Point, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 12/550,769

(22) Filed: Aug. 31, 2009

(65) Prior Publication Data
US 2011/0018759 A1    Jan. 27, 2011

Related U.S. Application Data

(60) Provisional application No. 61/227,855, filed on Jul. 23, 2009.

(51) Int. Cl.
*G01S 19/03* (2010.01)
*G01C 21/36* (2006.01)
*G01S 5/00* (2006.01)

(52) U.S. Cl.
CPC .......... *G01C 21/3688* (2013.01); *G01S 5/0027* (2013.01); *G01S 5/0072* (2013.01)

(58) Field of Classification Search
CPC .. G21C 21/3688; G01S 5/0027; G01S 5/0072
USPC .......................... 342/357.4; 701/213; 340/5.8
See application file for complete search history.

(56) References Cited

U.S. PATENT DOCUMENTS

| | | | | |
|---|---|---|---|---|
| 5,543,802 A | * | 8/1996 | Villevieille et al. | 342/357.51 |
| 6,073,075 A | * | 6/2000 | Kondou et al. | 701/203 |
| 6,246,376 B1 | * | 6/2001 | Bork et al. | 343/760 |
| 6,321,158 B1 | * | 11/2001 | DeLorme et al. | 701/426 |
| 6,360,169 B1 | * | 3/2002 | Dudaney | 701/467 |
| 6,407,698 B1 | * | 6/2002 | Ayed | 342/357.31 |
| 6,480,147 B2 | * | 11/2002 | Durst et al. | 342/357.55 |
| 6,489,921 B1 | * | 12/2002 | Wilkinson | 342/357.31 |
| 6,650,999 B1 | * | 11/2003 | Brust et al. | 701/517 |
| 6,701,249 B1 | * | 3/2004 | Casino | 701/208 |
| 6,725,138 B2 | * | 4/2004 | DeLuca et al. | 701/36 |
| 6,738,712 B1 | * | 5/2004 | Hildebrant | 701/431 |
| 6,791,477 B2 | * | 9/2004 | Sari et al. | 340/995.19 |
| 7,092,722 B1 | * | 8/2006 | Oh et al. | 455/456.1 |
| 7,155,238 B2 | * | 12/2006 | Katz | 455/456.1 |

(Continued)

OTHER PUBLICATIONS

"Google Maps", Wikipedia article, Jul. 21, 2008 version.*

*Primary Examiner* — Frank J McGue
(74) *Attorney, Agent, or Firm* — Garlick & Markison; Edward J. Marshall

(57) ABSTRACT

A navigation system includes a Global Positioning System (GPS) enabled wireless phone and a GPS navigation system. The GPS enabled wireless phone includes a GPS receiver, a communications interface, and processing circuitry coupled to the GPS receiver and to the communications interface. The GPS navigation system includes a GPS receiver, a communications interface operable to communicatively couple to the communications interface of the GPS enabled wireless phone, and processing circuitry coupled to the GPS receiver and to the communications interface. The processing circuitry of the GPS navigation system is operable to establish device pairing with the GPS enabled wireless phone and to exchange GPS information and other information with the GPS enabled wireless phone via the secure link.

31 Claims, 11 Drawing Sheets

(56) References Cited

U.S. PATENT DOCUMENTS

| | | | |
|---|---|---|---|
| 7,826,945 B2* | 11/2010 | Zhang et al. | 701/36 |
| 7,877,208 B1* | 1/2011 | Battista | 701/213 |
| 2002/0008614 A1* | 1/2002 | Yeh et al. | 340/425.5 |
| 2002/0152205 A1* | 10/2002 | Hodam et al. | 707/3 |
| 2003/0020638 A1* | 1/2003 | Sari et al. | 340/995 |
| 2004/0121784 A1* | 6/2004 | Park et al. | 455/456.1 |
| 2004/0158401 A1* | 8/2004 | Yoon | 701/209 |
| 2005/0010417 A1* | 1/2005 | Holmes | 704/275 |
| 2005/0287950 A1* | 12/2005 | Helden et al. | 455/41.2 |
| 2006/0143455 A1* | 6/2006 | Gitzinger | 713/170 |
| 2007/0001904 A1* | 1/2007 | Mendelson | 342/450 |
| 2007/0016371 A1* | 1/2007 | Waid et al. | 701/213 |
| 2007/0106468 A1* | 5/2007 | Eichenbaum et al. | 701/211 |
| 2007/0224980 A1* | 9/2007 | Wakefield | 455/418 |
| 2008/0010131 A1* | 1/2008 | Bridges et al. | 705/14 |
| 2008/0027643 A1* | 1/2008 | Basir et al. | 701/213 |
| 2008/0165024 A1* | 7/2008 | Gretton et al. | 340/825.22 |
| 2009/0096573 A1* | 4/2009 | Graessley | 340/5.8 |
| 2009/0156123 A1* | 6/2009 | Kim | 455/41.2 |
| 2009/0164121 A1* | 6/2009 | Chen et al. | 701/213 |
| 2010/0216432 A1* | 8/2010 | Wu | 455/411 |

* cited by examiner

COUPLED GPS PHONE AND NAVIGATION SYSTEM

BACKGROUND OF THE INVENTION

1. Field of the Invention

The present invention relates generally to electronic devices; and more particularly to Global Position System (GPS) navigation systems and wireless phones.

2. Description of the Related Art

Wireless communication systems and navigation systems are well known. A Global Positioning System (GPS) based navigation system includes a GPS receiver that receives information from satellites that are orbiting the earth and uses this information to determine a location of the GPS receiver a point on the surface of the earth or a point a particular altitude above the surface of the earth. Navigation systems may be installed in automobiles, aircraft, boats, and various other devices. Further navigation systems may be installed in hand-held units such as hand-held navigation systems and wireless phones.

Wireless communication systems include cellular wireless communication systems, Wireless Local Area Networks (WLANs), Wireless Personal Area Networks (WPANs), Wireless Wide Area Network (WWANs), satellite communication systems, and various other types of wireless communication systems. Each of these types of wireless communication systems supports wireless communications according to one or more communication protocol standards. For example, cellular wireless communication systems may operates according to GSM, CDMA, WCDM, TDMA, and/or other communication protocol standards, WLANs may operate according to one or more versions of the IEEE802.11x standards, WPANs may operate according to the Bluetooth standard, and WWANs may operate according to the WiMAX standard.

When a navigation system is located within a vehicle, the navigation system is typically fixed to the vehicle or installed as part of the vehicle. Examples of vehicles within which a navigation system may be installed include automobiles, boats, airplanes, trucks, and trains, among other vehicles. Further, portable navigation systems may be semi-permanently mounted within such vehicles, for example with an antenna for the navigation system mounted to the vehicle and the portable navigation system being removable. The navigation system determines the location of the vehicle and also assists an operator of the vehicle in traveling to particular locations and/or a taking particular route to a destination location. Navigation systems assisting in the operation of a car or truck, for example, typically instruct routing along particular roads. Navigation systems assisting in the operation of a boat may direct the boat along predetermined paths having sufficient depth.

GPS enabled wireless phones are employed by users to determine their location. Location of handheld device may be relevant not only for determining a location with respect to a desired location but for helping a user reach a desired destination. GPS enabled wireless phones also include one or more wireless interfaces that are used to enable wireless communications between the user and a wireless infrastructure. For example, a GPS enabled wireless phone may include a cellular network interface, a WLAN interface, and/or a WPAN interface to support communications. These communications may be voice communications, data communications, and/or a combination of the two.

Shortcomings exist with regard to navigation systems and GPS enabled wireless phones. Such shortcomings relate to the manner in which navigation may be used in conjunction with these devices. For example, a user of a navigation system that is mounted within a vehicle may very well use the navigation system to get from point A to point B. Further, a user of a GPS enabled wireless phone may use the GPS receiver therein to go from one place to another. However, typically there is no communication between these devices. For example, a user of a GPS enabled wireless phone may take the phone with him or her to a shopping mall and shop therein. The GPS enabled wireless phone, while useful in locating the user with respect to a particular store is not useful in locating itself with respect to the vehicle. These and other shortcomings and others will be apparent when considered in conjunction with the teachings of the present invention.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

DETAILED DESCRIPTION

Figure 1:
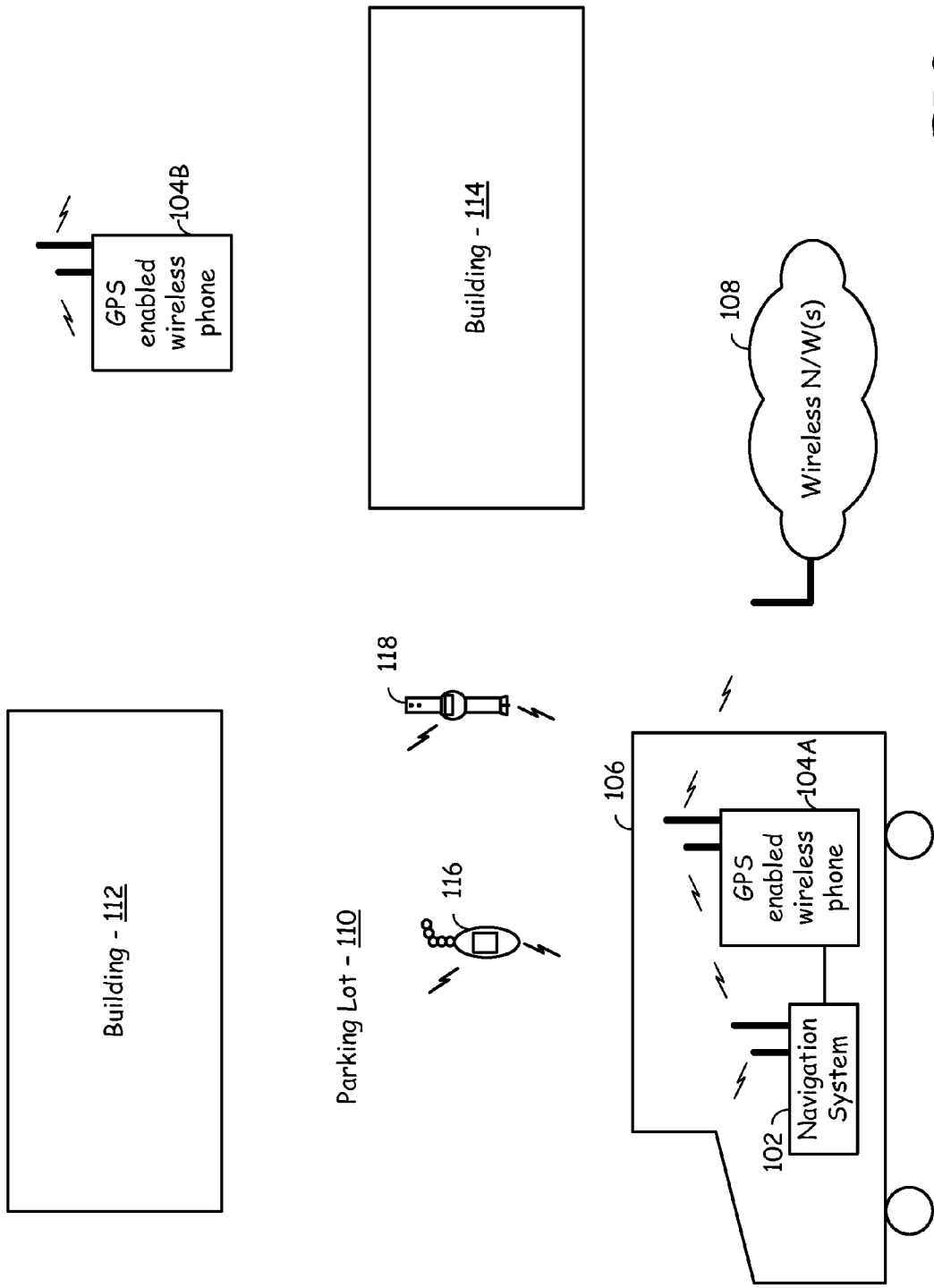
FIG. 1 is a system diagram illustrating a navigation system and a GPS enabled wireless phone constructed according to one or embodiments of the present invention.

FIG. 1 is a system diagram illustrating a navigation system and a GPS enabled wireless phone constructed according to one or embodiments of the present invention. Illustrated in FIG. 1 is a navigation system 102 that mounts within a vehicle 106. Vehicle 106 is shown to be an automobile in FIG. 1. However, the teachings and features of the present invention may be applied to differing embodiments that include differing vehicle types. These differing vehicle types may include watercraft such as a boat, personal watercraft, or a ship, trucks, aircraft, helicopters, motorcycles, and other vehicles that transport humans from one point to another. Also shown in FIG. 1 is a GPS enabled wireless phone at two differing locations. At a first location, the GPS enabled wireless phone 104A is shown to reside within vehicle 106. At a second location, the GPS enabled wireless phone 104B is shown to reside outside of the vehicle 106. The navigation system 102 is referred to herein as a GPS navigation system or simply as a navigation system. Such references are common to a device that provides navigation for a vehicle, i.e., is a part of the vehicle 106 or that is affixed/removably affixed to the vehicle 106. Additional operations of the system illustrated in FIG. 1 will be described further herein with reference to FIGS. 3-11.

According to various embodiments of the present invention, the GPS enabled wireless phone 104A is securely paired with the navigation system 102, such secure pairing supporting the exchange of GPS information with the navigation system 102. Shown in FIG. 1 are both wireless links and wired links between the GPS enabled wireless phone 104A and the navigation system 102. In various embodiments, the communication exchange between the navigation system 102 and the GPS enabled wireless phone 104 may be serviced via a wired link or a wireless link. The various operations described herein with reference to FIGS. 3-9 may be accomplished using one or more of the wireless or wired links.

The GPS enabled wireless phone 104A or 104B may establish wireless communications with one or more wireless network 108, which may support communications with the navigation system 102. The wireless networks 108 may include cellular wireless networks, Wireless Local Area Networks (WLANs), Wireless Personal Area Networks (WPANs), Wireless Wide Area Networks (WWANs), satellite networks, and/or other types of wireless networks. The GPS enabled wireless phone 104A services data and/or voice communications for a user with the wireless networks 108. The wireless networks 108 couple to one or more wireless network infrastructures that allow user of the GPS enabled wireless phone 104A to communicate with other voice terminals, with Internet servers, and with other components available via the wireless networks 108. The navigation system may also communicate via the one or more wireless networks 108.

The GPS enabled wireless phone is shown at different position as 104B. This different position of the GPS enabled wireless phone 104B is external to the vehicle 106. According to various aspects of the present invention, the GPS enabled wireless phone 104A/104B and the navigation system 102 are securely paired to support communication there between. The secured pairing may be accomplished by initiation of the navigation system 102, by a user of the GPS enabled wireless phone 104A, or a combination of both. For example, when a user/owner of the GPS enabled wireless phone 104A owns the vehicle 106, the user may securely pair the navigation system 102 of the vehicle 106 with the GPS enabled wireless phone 104A on a semi-permanent basis. After the secure pairing is established, the navigation system 102 and GPS enabled wireless phone 104A support the exchange of GPS information there between. Such GPS information will be further described herein with reference to FIGS. 3-9. Generally, the GPS information includes coordinates, routes, destination information, waypoint information, and other information that may be categorized as navigation information, location information, and/or information that relate thereto.

With an example of an operation of the system of FIG. 1, a user of the GPS enabled wireless phone 104A arrives at a location in vehicle 106 that includes a parking lot 110, building 112, and building 114. Such location may be a shopping mall, a park, a government office, a vacation location, or another location within which the user of the GPS enabled wireless phone 104A may be unfamiliar. When the user parks the vehicle 106 in the large parking lot 110, the user may have difficulty later locating the vehicle. Thus, according to one aspect of the present invention, when the navigation system 102 detects that the vehicle is powered down, it passes its coordinates to the GPS enabled wireless phone 104A. Thus, at a later time, the user may use the GPS enabled wireless phone 104B to return to vehicle 106 easily, even though the parking lot 110 is large. Further, according to another aspect of the present invention, the navigation system 102 and the GPS enabled wireless phone 104A detects when the location of the GPS enabled wireless phone 104A is a distance away from the navigation system 102 that exceeds a particular threshold. This threshold may be exceeded using GPS coordinates of the navigation system 102 and the GPS enabled wireless phone 104A. Alternatively, the threshold may be exceeded when the navigation system 102 and GPS enabled wireless phone 104A lose direct wireless communications with one another, via a WPAN, for example. In such case, the GPS enabled wireless phone 104A marks its GPS location when the distance threshold is met. After marking the location of the navigation system 102, the GPS enabled wireless phone 104A may record its route as a user of the wireless phone 104A moves about. Based upon the information that the GPS enabled wireless phone 104A collects as it reaches the GPS enabled wireless phone 104B location, for example, the GPS enabled wireless phone will be able to direct the user back to the location at which the physical separation of the GPS enabled wireless phone and the navigation system 102 occurred.

According to additional aspects of the present invention, instead of having a GPS enabled wireless phone 104A/B paired with the navigation system 102, another device such as a wirelessly enabled key chain device 116 or a wirelessly enabled watch 118 may be paired with the navigation system 102. While these devices 116 and 118 do not service cellular communications they may wirelessly couple to a WPAN or WLAN, for example, to service other communications. Each of these devices 116 and 118 includes a GPS receiver, a wireless interface, and may include a wired interface. These devices 116 and 118 support secured pairing with the navigation system 102 via a wired or wireless communication path. After secure pairing the devices 116 or 118 then exchange GPS information with the navigation system 102. These devices 116 and 118 include a user interface, e.g., display, speakers, and/or microphone that allow the user to provide or obtain information from/to the navigation system 102.

For example, the device 116 or 118 may receive GPS coordinates from the navigation system 102 when exiting the vehicle 106. The device 116 or 118 uses these GPS coordinates later to direct the user back to the vehicle 102. Directions back to the vehicle 106 may be provided by a display of the device 116 or 118, e.g., arrow and distance displayed or a speaker of the device 116 or 118, e.g., audio directions such as distance and indications of direction to head. Generally, the device 116 or 118 may provide the same functionality as a cell phone of the present invention except for servicing cellular communications. Further, the cell phone of the present invention may take the form of a wrist watch or keychain attachment.

Figure 2:
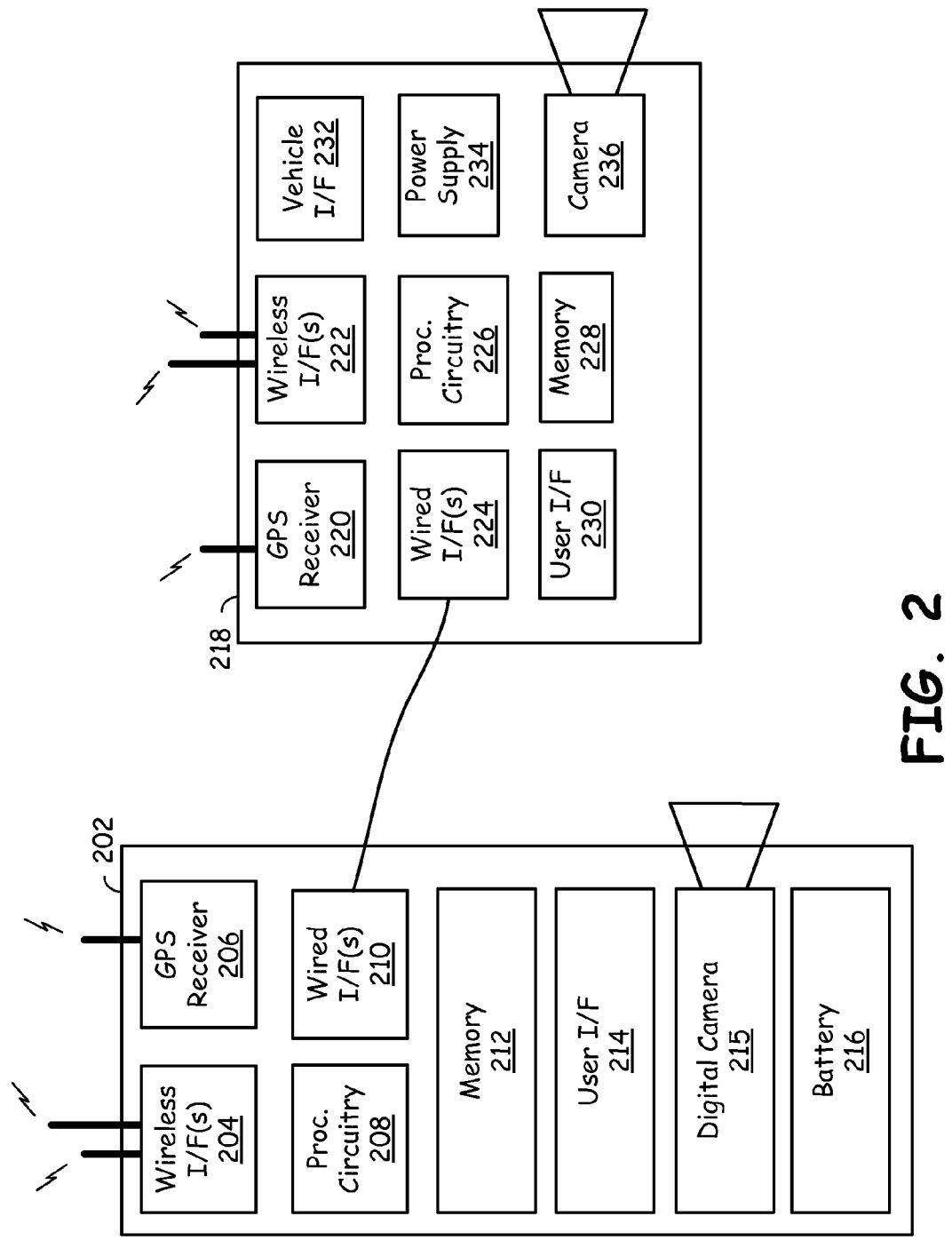
FIG. 2 is a block diagram illustrating components of a navigation system and components of a GPS enabled wireless phone constructed according to an embodiment of the present invention.

FIG. 2 is a block diagram illustrating components of a navigation system and components of a GPS enabled wireless phone constructed according to an embodiment of the present invention. As shown in FIG. 2, the GPS navigation system 218 may couple to the GPS enabled wireless phone 202 via a wired interface. Further, the GPS navigation system 218 may communicate with the GPS enabled wireless phone 202 via one or more wireless interfaces. The wired interface may support a USB coupling between the devices 202 and 218. Alternatively, a differing type of wired interface may be employed to establish communication there between. Direct wireless communications between the GPS navigation system 218 and the GPS enabled wireless phone 202 may be supported by a WPAN communication standard such as the Bluetooth communication protocol, a WLAN communication standard such as one or more of IEEE 802.11x communication standards, or via a cellular wireless interface standard. Further, the devices 202 and 218 may communicate with one another wirelessly indirectly via an infrastructure supported via a WLAN access point, a cellular network infrastructure, a WWAN network infrastructure, or other wireless communication infrastructures.

The GPS enabled wireless phone 202 includes one or more wireless interfaces 204, a GPS receiver 206, processing circuitry 208, one or more wired interfaces 210, memory 212, user interface 214, a digital camera 215, and a battery 216. These various components 204, 206, 208, 210, 212, 214, 215, and 216 are coupled via one or more communication and/or power buses. Further, the various components of the GPS enabled wireless phone 202 may wirelessly communicate with one another. The various components 204-216 of the GPS enabled wireless phone 202 may be formed on one or more semiconductor substrates and couple there between via conductors and isolated.

The wireless interfaces 204 may support WLAN communications, WPAN communications, WWAN communications, cellular communications, satellite communication systems, and/or various other wireless interface types. For each of these communication types, the wireless interfaces 204 may support one or more communication protocol standards. The GPS receiver 206 operates conventionally to receive satellite communication signals from a plurality of GPS satellites and to determine a location of the GPS enabled wireless phone 202 based thereupon.

Processing circuitry 208 includes one or more processing devices that are operable to execute software instructions and to process data. For example, the processing circuitry 208 may include a microprocessor, a digital signal processor, custom logic circuitry, and/or various other types of circuitry. Memory 212 includes one or more of random access memory, read-only memory, erasable memory, magnetic memory, optical memory, flash memory, and/or any other type of memory that is capable of storing computer instructions and data and providing them to the various other components within the GPS enabled wireless phone 204. The wired interfaces 210 support one or more wired communication standards that enable the GPS enabled wireless phone 202 to communicate with the GPS navigation system 218 via a wired link. The user interface 214 may include one or more of a display, a keyboard, a mouse, a speaker, a microphone, and/or various other types of devices that support interface with the user. Digital camera 215 may support capture of still images, moving images, or both still and moving images. Battery 216 powers the various components of the GPS enabled wireless phone 202 and its operations.

The GPS navigation system 218 includes various components, some of these which may be similar or same as the components already described with reference to the GPS enabled wireless phone. These various components of the GPS navigation system 218 include a GPS receiver 220, one or more wireless interfaces 222, one or more wired interfaces 224, processing circuitry 226, memory 228, one or more user interfaces 230, a vehicle interface 232, one or more power supplies 234, and a digital camera 236. The GPS receiver 220 of the GPS navigation system 218 functions to determine the location of the GPS navigation system. In many embodiments, the GPS navigation system 218 is fixed to a vehicle such as an automobile. However, in other embodiments, GPS navigation system 218 may be temporarily affixed to a vehicle or be moved from one vehicle to another. Such devices are typically referred to as handheld GPS units. In many embodiments, such handheld GPS navigation unit may be mounted within a vehicle upon a dash of the vehicle or in another location in the vehicle such that it is at least temporarily fixed to the vehicle.

The wireless interfaces 222 of the navigation system 218 support various communication protocol standards including those relating to cellular networks, WPANs, WLANs, WWANs, and/or other communication standards. The wired interfaces 224, processing circuitry 226, user interface 230, memory 228, and camera 236 are similar/same as those previously described with reference to the GPS enabled wireless phone 202. Power supply 234 of the GPS navigation system 218 typically receives power from a battery supply of a vehicle in which the GPS navigation system 218 is at least temporarily mounted. In such case, the power supply 234 may detect a depowering of the vehicle or at least the depowering of the GPS navigation system 218 which would indicate that the vehicle has stopped. Further, vehicle interface 232, which interfaces to the vehicle in which GPS system either permanently or temporarily mounts, may collect information from vehicle computers or provide information to vehicle computers. The vehicle interface 232 is employed by the GPS navigation system 218 of the present invention to collect information which would be passed along to the GPS enabled wireless phone 202.

Figure 3:
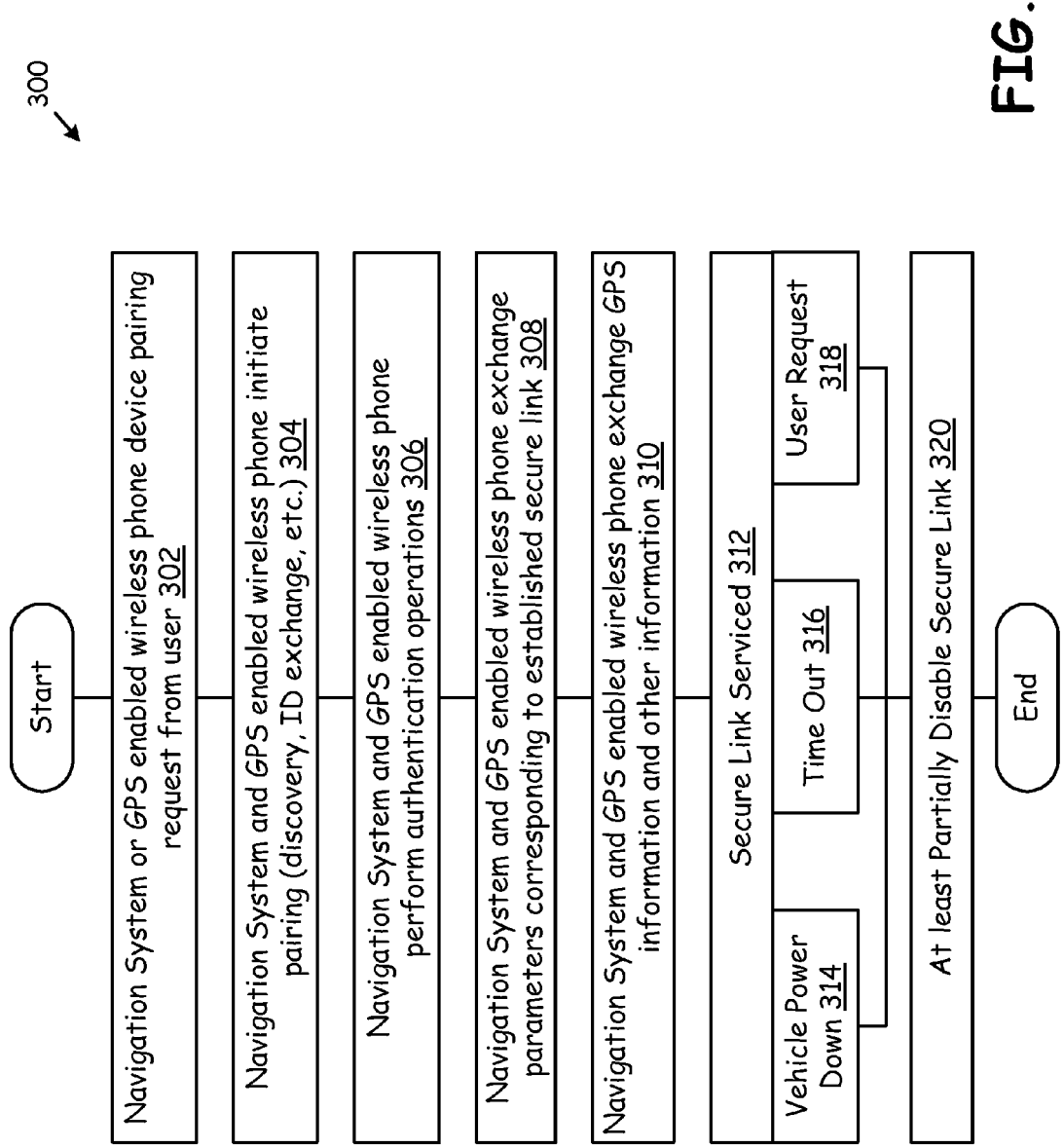
FIG. 3 is a flow chart illustrating operations according to one or more embodiments of the present invention.

FIG. 3 is a flow chart illustrating operations according to one or more embodiments of the present invention. The operations 300 of FIG. 3 commence with the navigation system or GPS enabled wireless phone receiving a device pairing request from a user (Step 302). In one particular example, the GPS navigation system and GPS enabled wireless phone may be paired when the devices are coupled via a wired link, e.g., when the devices couple via a wired link within a vehicle. Such request may also be received by one or other of the navigation system and GPS enabled wireless phone via a wireless link, such as a Bluetooth, WPAN link or an IEE802.11x WLAN link. For example, when a user purchases an automobile or acquires an automobile at a rental location, the user may desire that his or her GPS enabled wireless phone may be securely paired with a navigation system of the car. In such case, a user makes such a request at Step 302 to initiate a secure pairing between the navigation system and the GPS enabled wireless phone. Operation continues with the navigation system and GPS enabled wireless phone initiating pairing (Step 304). Pairing is initiated after receiving the request from the user via a discovery of the devices with one another, identifier exchange, exchange of operational parameters such as public and private keys, and exchange of other information that will enable secure pairing between the navigation system and the GPS enabled wireless phone.

Operation continues with the navigation system and the GPS enabled wireless phone performing authentication operations to enable the secure pairing of the devices (Step 306). Then, the navigation system and the GPS enabled wireless phone exchange parameters with one another that correspond to establish a secure link (Step 308). This established wireless link may be serviced via one or more other communication paths than those which were used for pairing operations. For example, in some operations, the secure pairing of the navigation system and the GPS enabled wireless phone may only occur when the device are connected to one another with a wired link. However, with the secure link established, the secure link may be broken via the wired link and re-established via a wireless link simply by a requesting of one or other of the navigation system or the GPS enabled wireless phone. For example, a user having both the GPS enabled wireless phone and a vehicle in which navigation system mounts may establish a secure link between the devices at a first time and then may use the secure link at another time to exchange secure information between the navigation system and the GPS enabled wireless phone. According to another example, the secure link only exists so long as the first communication path is maintained. For example, a user of a GPS enabled phone may establish securing pairing with the navigation system of a taxi and use the secure link to transmit/receive GPS navigation information. When the user leaves the taxi the secure link is automatically severed.

Operation continues with the navigation system and GPS enabled wireless phone exchanging GPS information and other information (Step 310). The GPS information may include GPS based routes, GPS coordinates, and other information such as waypoint information that is desirable to be exchanged between the devices. The GPS information exchanged via the secure link at step 310 may also include destination information relating to GPS coordinates and information regarding the destination such as a telephone number at the destination, an address of the destination, electronic coupons that were previously loaded to the navigation system and/or other information relating to the destination. The other information exchanged at step 310 may include pictures, advertisements, information regarding a vehicle such as a car or boat, communications that have been entered via one device and want to be passed to the other device securely, and/or other information not directly or at all related to the GPS information. For example, with the navigation system mounted within a car, a user may desire for the car to use an onboard camera to take a picture representing a view from the car. The user may then use this picture taken by the navigation system and sent to the GPS enabled wireless phone to assist in locating the vehicle in the parking lot. Such operation may also be employed to take a picture by the navigation system that simply notifies the user of events surrounding or proximate to a vehicle in which the navigation system mounts. Thus, in such case, the navigation system collects information and passes the information to the GPS enabled wireless phone. Further, these operations may be supported in reverse with the GPS enabled wireless phone collecting information and passing it to the navigation system. These devices may also share resources in other manners as well. For example, when the GPS enabled wireless phone has low battery charge, it may use the navigation system to bridge communications to a cellular network, for example.

The operation of Step 310 may also include the routing of communications between the GPS enabled wireless phone and the navigation system. For example, the navigation system may not have a cellular communication interface but may have a user interface that supports voice communications. In such case, even though the navigation system does not support wireless communications via a cellular network, these communications may be relayed via the GPS enabled phone. Moreover, communications between the navigation system and the GPS enabled wireless phone may be relayed via a wireless local area network, a cellular network, the Internet, and/or other communication networks, i.e., communications between the navigation system and the GPS enabled wireless phone are not direct.

Secure communications between the paired navigation system and GPS enabled wireless phone are serviced for a period of time until the secure link is de-serviced (Step 312). The secure link may be disabled or ceased upon a vehicle power down (Step 314), a timeout event (Step 316), or a user request (Step 318). For example, when a vehicle is powered down at Step 314, there may be no further need to have the secure link established because no additional meaningful communications would require servicing by the secure link after vehicle power down at Step 314. However, this is not always the case with the embodiments of the present invention because communications between the vehicle may be important even after the vehicle is powered down. The user may request that the secure link be de-serviced at Step 318 when the user no longer requires such secure link. Examples of this are when a secure link has been previously established between a GPS enabled wireless phone and a taxicab navigation system, a GPS enabled wireless phone and a rental car navigation system, a GPS enabled wireless phone and a rented boat navigation system, and/or other situations in which the secure link is no longer required because communication between the GPS navigation system and the GPS enabled wireless phone is no longer important. Thus, from Steps 314, 316, and/or 318, the secure link between the GPS navigation system and the GPS enabled wireless phone is at least partially disabled (Step 320). From Step 320, operation ends.

The secure link described with reference to the operations 300 of FIG. 3 may support additionally functionality as well. For example, the secure link may be employed to allow a user to remotely control operation of an automobile. For example, when a user is in a shopping mall and is soon to return to the car, the user may desire to start the car remotely so that the car is cool (or warm) by the time the user returns to the car. The secure link established in the operations 300 of FIG. 3 may be employed to allow the user to initiate automatic car starting functions. Further, the user may employ the secure link between the GPS enabled wireless phone and the GPS navigation system to cause the car lights to flash, the horn to honk, or various other functions that would be advantageous to be remotely caused.

Figure 4:
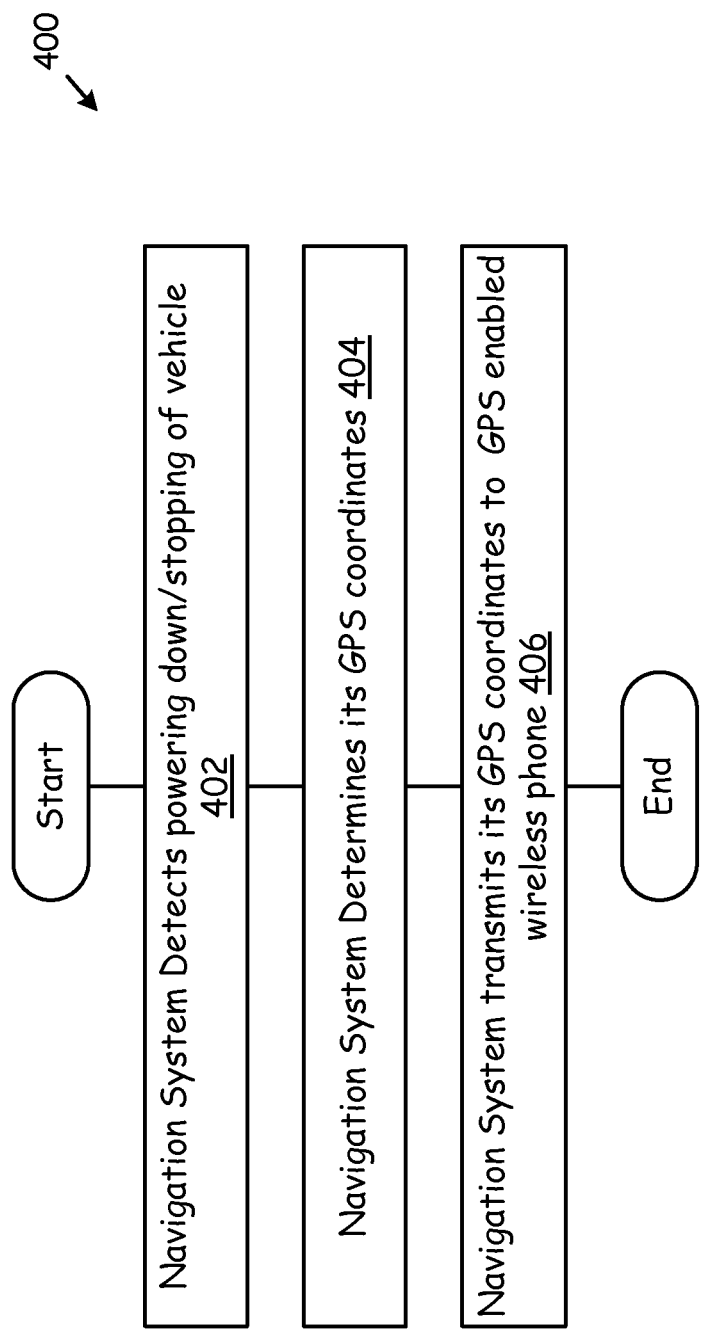
FIG. 4 is a flow chart illustrating additional operations according to one or more embodiments of the present invention.

FIG. 4 is a flow chart illustrating additional operations according to one or more embodiments of the present invention. The operations 400 of FIG. 4 commence when the navigation system detects a powering down or a stopping of the vehicle in which the navigation system mounts (Step 402). The navigation system would typically detect powering down or stopping of the vehicle via the vehicle interface 232 or power supply 234 of FIG. 2. For example, the detection at Step 402 may be accomplished by the power supply 234 of FIG. 2 when the navigation system detects that power is no longer being provided to the power supply 234. Because the power supply 234 has some energy storage capacity and/or delays shut down, the navigation system 218 has sufficient time to complete operations 400 of FIG. 4. The navigation system then determines its GPS coordinates (Step 404). The navigation system then transmits its GPS coordinates to the GPS enabled wireless phone with which it is securely paired (Step 406). From Step 406, operation ends.

Figure 5:
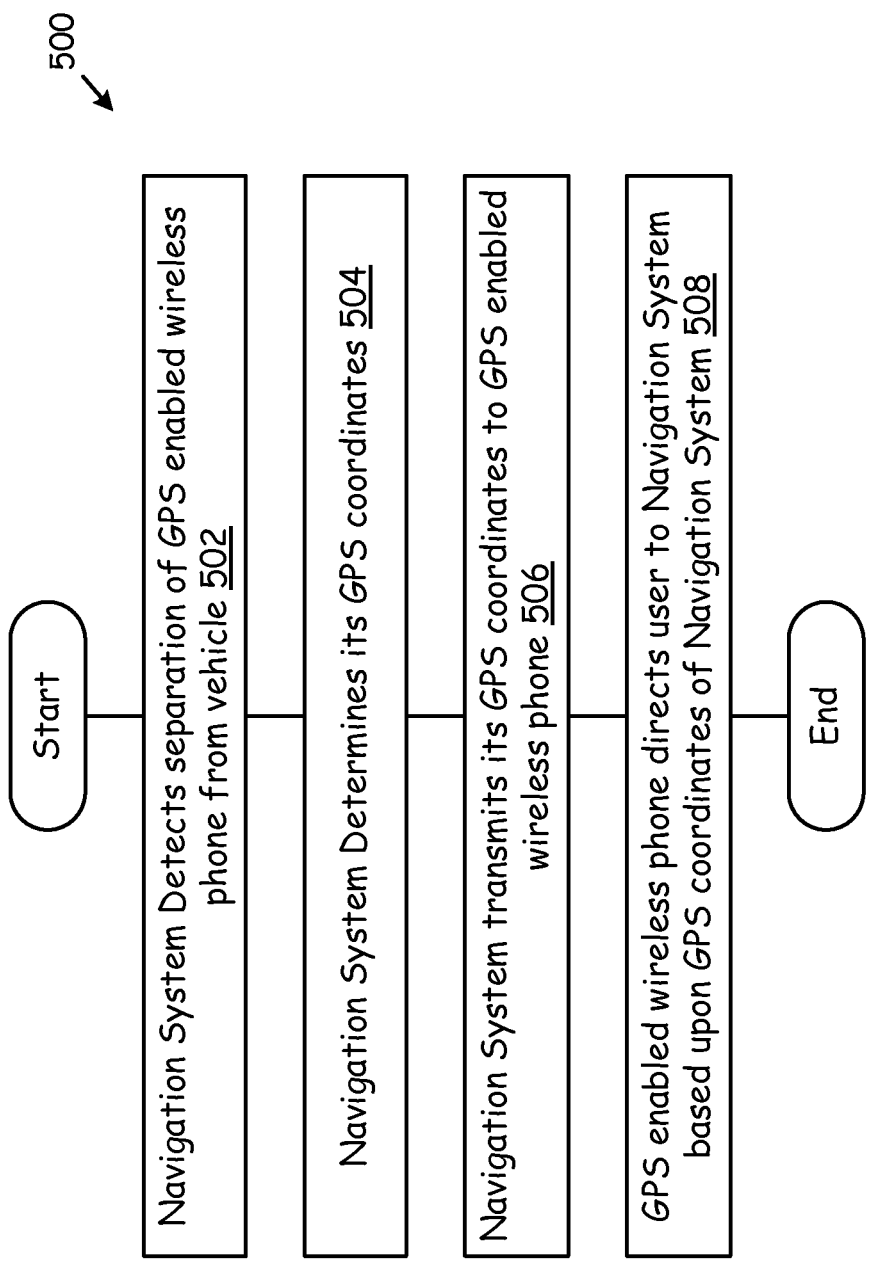
FIG. 5 is another flow chart illustrating operations according to other aspects of embodiments of the present invention.

FIG. 5 is another flow chart illustrating operations according to other aspects of embodiments of the present invention. The operations 500 of FIG. 5 commence with the navigation system detecting a separation of the GPS enabled wireless phone from the vehicle (Step 502). The navigation system and/or GPS enabled wireless phone may detect a separation of the GPS enabled wireless phone from the vehicle based upon a difference in GPS coordinates of the two devices. Further and/or alternatively, the navigation system and the GPS enabled wireless phone may detect their separation by a loss of a direct wireless communications, e.g., loss of WPAN (Bluetooth) communication. Still further, the navigation system and GPS enabled wireless phone may detect separation when a wired communication link there between is separated. Further, other techniques may also be employed to detect physical separation of the GPS enabled wireless phone and the GPS navigation system. Operation proceeds with the navigation system determining its GPS coordinates (Step 504). The navigation system then transmits its GPS coordinates to the GPS enabled wireless phone (Step 506). Later, the GPS enabled wireless phone may direct the user to a navigation system based upon the GPS coordinates to the navigation system (Step 508). The operations 500 of FIG. 5 would most typically be performed when the user of a GPS enabled wireless phone exits an automobile, a motorcycle, a truck, a boat, or another device with which the user desires to later retrieve. For example, when an operator of a boat departs the boat at a port with which he/she is unfamiliar, such GPS coordinate exchange may be very important.

Figure 6:
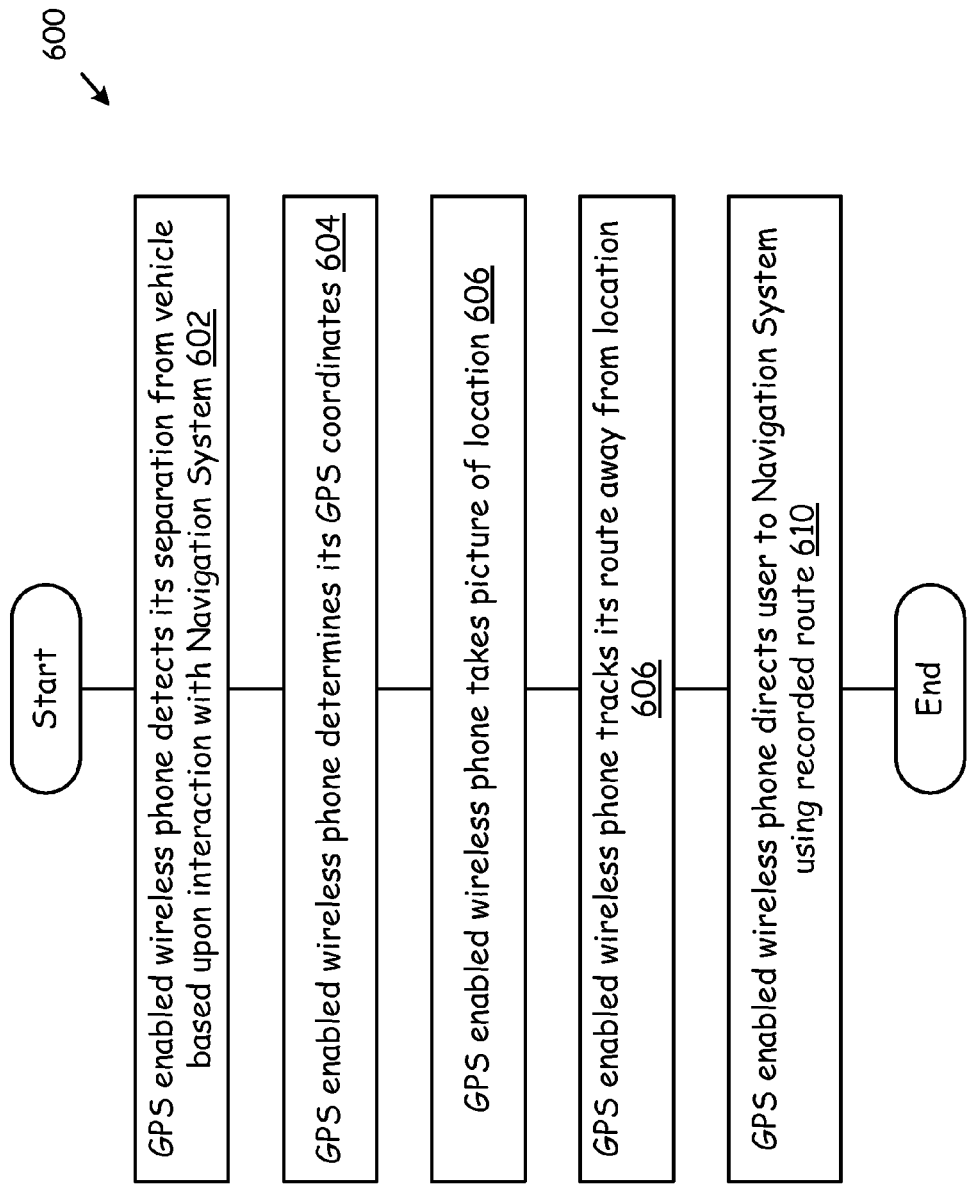
FIG. 6 is a flow chart illustrating additional operations according to various embodiments of the present invention.

FIG. 6 is a flow chart illustrating additional operations according to various embodiments of the present invention. The operations 600 of FIG. 6 commence with the GPS enabled wireless phone detecting a separation from the vehicle based upon interaction with the navigation system (Step 602). Detection at Step 602 may be performed when the vehicle is powered-down, when the GPS enabled wireless phone and the GPS navigation system detect the physical separation between the two or using some other technique. Then, the GPS enabled wireless phone determines its GPS coordinates (Step 604). The GPS enabled wireless phone may then take a picture of its location (Step 606). The picture may be useful later for a user of the wireless phone to locate his or her vehicle amongst a large number of vehicles. The GPS enabled wireless phone then tracks its route away from the location that was determined at Step 604 (Step 608). Later, after the GPS enabled wireless phone has tracked its location away from the user, the GPS enabled wireless phone directs the user to the navigation system via the recorded route (Step 610). From Step 610, operation ends.

Figure 7:
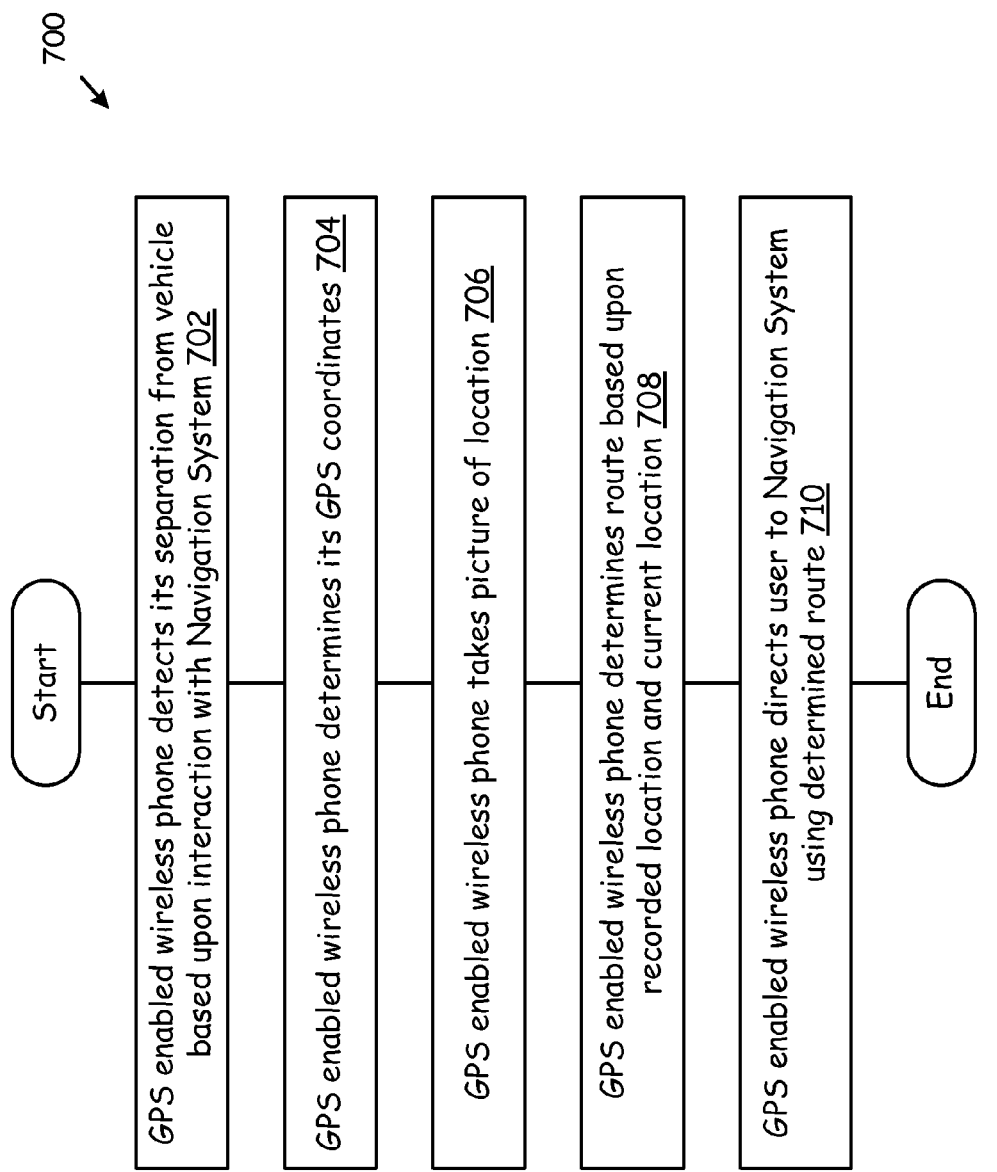
FIG. 7 is a flow chart illustrating still other operations according to embodiments of the present invention.

FIG. 7 is a flow chart illustrating still other operations according to embodiments of the present invention. The operations 700 of FIG. 7 commence with the GPS enabled wireless phone detecting a physical separation from a vehicle in which the navigation system is mounted based upon interaction with the navigation system (Step 702). Such operation may be determined based upon a difference of GPS coordinates, loss of direct wireless communications between the two, and/or some other technique. The GPS enabled wireless phone then determines its GPS coordinates (Step 704). The GPS enabled wireless phone may then take pictures of its location (Step 706). At a later time, the GPS enabled wireless phone then determines a route from its current location to the GPS coordinates determined at Step 704 (Step 708). The GPS enabled wireless phone then directs a user to the navigation system using the route determined at Step 708 (Step 710). From Step 710, operation ends.

Figure 8:
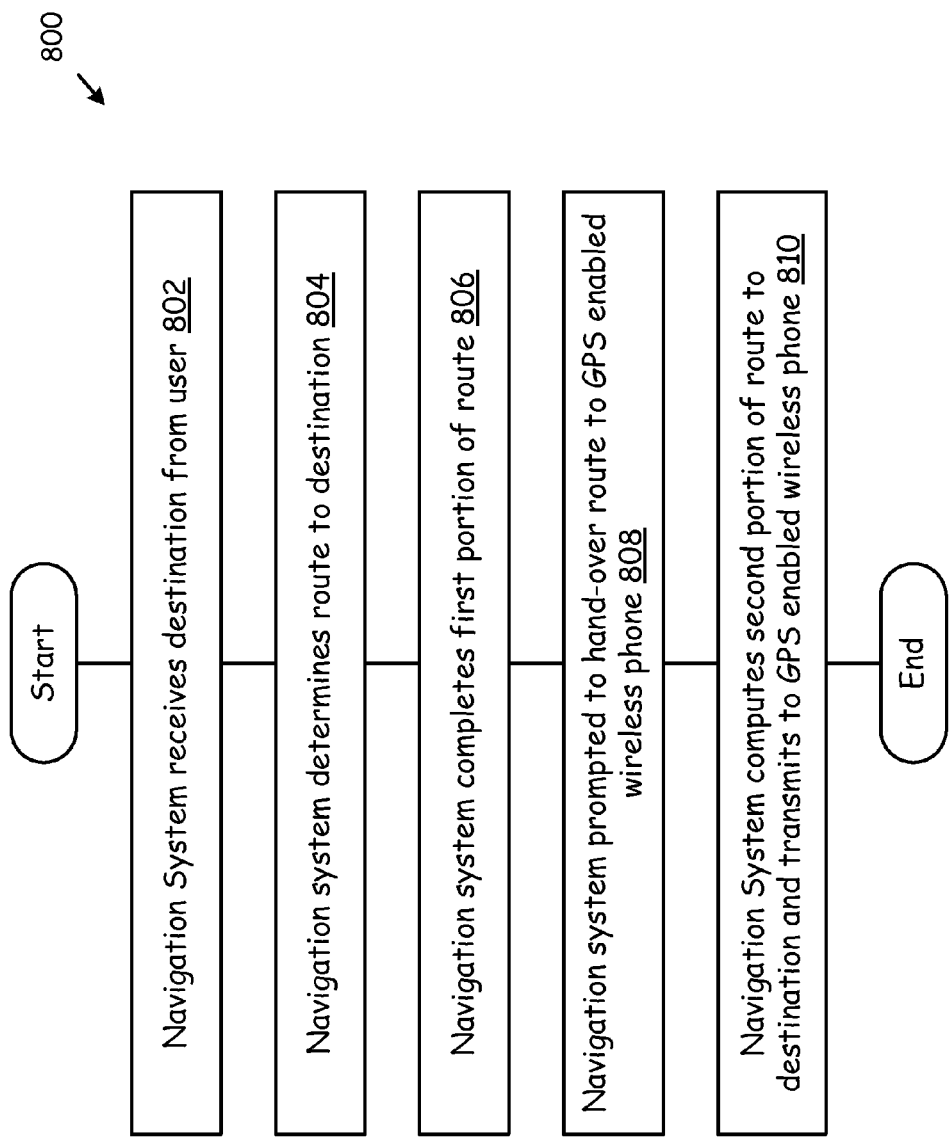
FIG. 8 is a flow chart illustrating operations according to one or more embodiments of the present invention.

FIG. 8 is a flow chart illustrating operations according to one or more embodiments of the present invention. The operations 800 of FIG. 8 commence with the navigation system receiving destination information from a user (Step 802). The destination information may be input by a user of a vehicle, for example. The navigation system then determines a route to the destination location from a starting location (Step 804). The navigation system is then employed to complete a first portion of the route (Step 806). For example, user of an automobile may use a navigation system of the automobile to complete the first portion of the route by following directions provided thereby. However, the destination may not be reachable by use of the vehicle. For example, a last portion of the route may have to be walked, taken with a bus, taken with a boat, or taken using a technique other than that available by the vehicle in which the navigation system mounts.

Then, based upon either detection of separation of a navigation system or GPS enabled wireless phone, or prompting by the user, the navigation system is prompted to handover the route to the GPS enabled wireless phone (Step 808). The navigation system then computes a second portion of the route to the desired destination and transmits the second portion of the route to the GPS enabled wireless phone (Step 810). Thus, in some cases, the navigation system determines a complete route from the starting location to destination location, executes a portion of the route, determines a second portion of the route based upon its intermediate location and the final destination, and hands off the route to the GPS enabled wireless phone at Step 810. From Step 810, operation ends.

Figure 9:
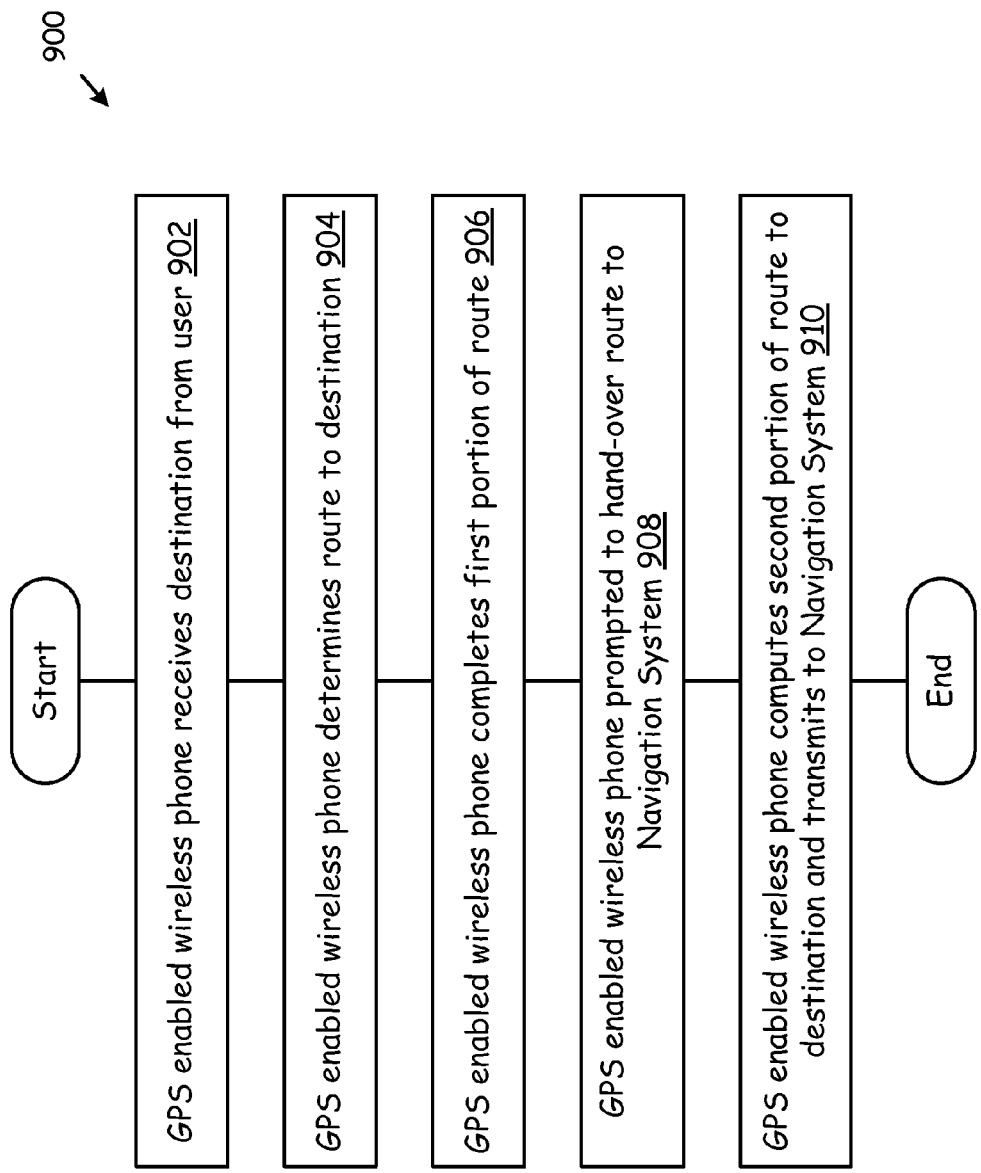
FIG. 9 is a flow chart illustrating operations according to one or more embodiments of the present invention.

FIG. 9 is a flow chart illustrating operations according to one or more embodiments of the present invention. The operations 900 of FIG. 9 commence with the GPS enabled wireless phone receiving a destination from a user (Step 902). Based upon the destination received at Step 902 and a current location of the GPS enabled wireless phone, the GPS enabled wireless phone determines a route to the destination (Step 904). The GPS enabled wireless phone then completes a first portion of the route via directing a user of the GPS enabled wireless phone along the route (Step 906). The GPS enabled wireless phone is then prompted to handover the route to a navigation system (Step 908). Such prompting may be based upon interaction with the user, based upon a detection of proximity to the navigation system, or based upon another technique. The GPS enabled wireless phone then computes the second portion of the route to the destination and transmits the second portion of the route to the navigation system for execution therewith (Step 910). In each of Steps 810 and 910 of FIGS. 8 and 9, respectively, in another operation, the destination GPS coordinates could be handed over from one device to another with the receiving device computing a continued portion of a route based upon the destination coordinates.

Figure 10:
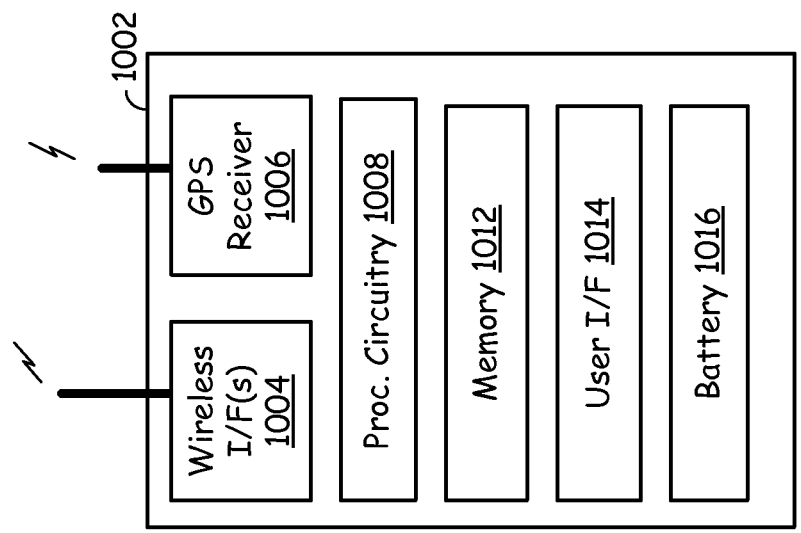
FIG. 10 is a block diagram illustrating the structure of another device constructed according to one or more embodiments of the present invention.

FIG. 10 is a block diagram illustrating the structure of another device constructed according to one or more embodiments of the present invention. The device 1002 of FIG. 10 may be the keychain attachment 116 or the wrist watch 118 of FIG. 1 or another device that differs in structure slightly from the cell phones described herein. The device 1002 includes one or more wireless interfaces 1004, a GPS receiver 1006, processing circuitry 1008, memory 1012, one or more user interfaces 1014, and a battery 1016. The structure and operation of these components 1004, 1006, 1008, 1012, 1014, and/or 1016 may be same/similar as components described previously herein with respect to the cell phones of the present invention. Generally, the device 1002 of FIG. 10 performs similar/same operations as those for the cell phone of the present invention described herein except for servicing cellular communications. Because the device 1002 of FIG. 10 does not include a cellular telephone interface it may be of a smaller size and lesser battery consumption.

Figure 11:
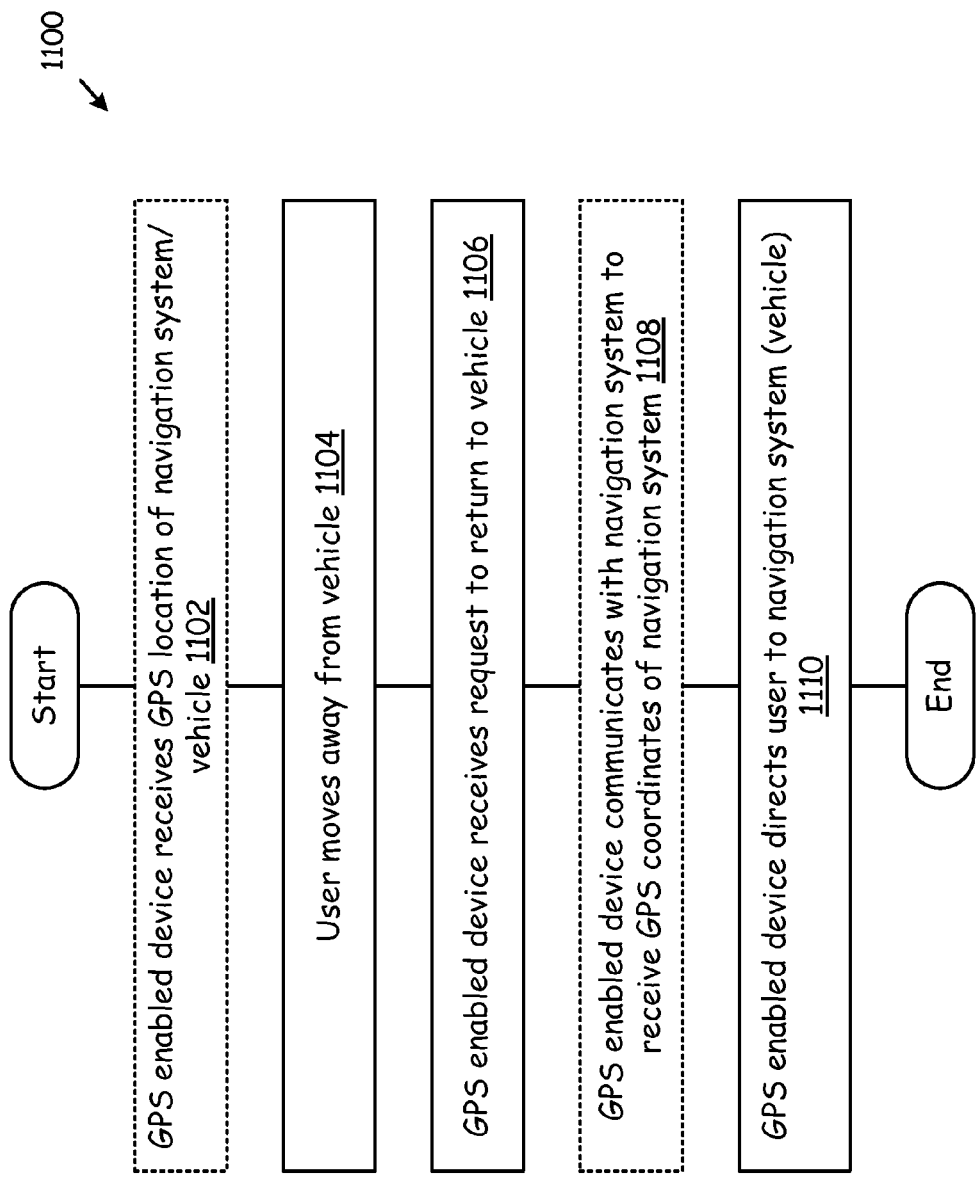
FIG. 11 is a flow chart illustrating operations of another device constructed according to one or more other embodiments of the present invention.

FIG. 11 is a flow chart illustrating operations of another device constructed according to one or more other embodiments of the present invention. As a first optional operation (after pairing of the GPS enabled device with the navigation system), the GPS enabled device receives the GPS location of the navigation system (vehicle) (Step 1102). The user then moves away from the vehicle (Step 1104), perhaps in the parking lot of a shopping mall, in a park, or in another location. At a later time, the GPS enabled device receives a request to return to the vehicle (navigation system) (Step 1106). If the GPS enabled device did not receive the GPS location of the navigation system/vehicle at step 1102, it communicates with the navigation system to receive the GPS location of the navigation system (Step 1108). Further, the GPS enabled device may communicate with the navigation system to receive updated GPS location or to determine whether the prior location is valid. For example, if a driver of the vehicle moves the car from its original location, an updated GPS location may be received. Such communication with the navigation system may be via a WPAN, a WPAN, or another communication format supported by the GPS enabled device.

The GPS enabled device then directs the user to the navigation system (vehicle) (Step 1110). Directions provided to the user may be visual via a LCD or LED display of the GPS enabled device, via a pointer of the GPS enabled device, or via other visual means. Alternately, or in addition to providing a visible indication of directions, the GPS enabled device may provide additional information audibly, such as indications of direction and distance. Further, the GPS enabled device, determining its own location, and using additional information it has loaded, such as the external structure of the mall, may provide other audio instructions. For example, the GPS enabled device may direct the user to exit a shopping mall upstairs, adjacent one or more stores and provides additional directions after exiting. The GPS enabled device may other audio instructions within a park, for example, such as directing user to take a specific trail from a meeting area, to follow a particular marked path, and/or to provide other audio instructions. These may be downloaded by the GPS enabled device from a WPAN or WLAN of the mall or park, or may have been downloaded from the navigation system prior to or immediately departing from the vehicle.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output (s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A navigation system comprising:
    a Global Positioning System (GPS) enabled wireless phone comprising:
        a cellular wireless interface configured to be coupled to a cellular wireless communications network;
        a GPS receiver;
        a communications interface operable to pair wirelessly with devices individually via a wireless personal area network (WPAN) protocol; and
        processing circuitry coupled to the GPS receiver and to the communications interface;
    a GPS navigation system carried in a vehicle, the GPS navigation system comprising:
        a GPS receiver;
        a communications interface configured to individually pair with the communications interface of the GPS enabled wireless phone via the WPAN;
        processing circuitry coupled to the GPS receiver and the communications interface of the GPS navigation system, wherein the processing circuitry of the GPS navigation system physically couples to a vehicle and resides within the vehicle, the processing circuitry configured to:
            establish device pairing with the GPS enabled wireless phone via the WPAN;
            exchange GPS information with the GPS enabled wireless phone via the WPAN;
            determine GPS coordinates of the vehicle;
            transmit GPS coordinates of the vehicle to the GPS enabled wireless phone;
            detect that a physical separation of the GPS enabled wireless phone and the GPS navigation system exceeds a threshold, wherein the threshold is determined based on a distance at which direct communication via the WPAN is lost; and
            transmit the GPS coordinates of the vehicle to the GPS enabled wireless phone via a cellular network in response to detecting loss of direct communication via the WPAN.

2. The navigation system of claim 1, wherein in establishing device pairing with the GPS enabled wireless phone the processing circuitry of the GPS navigation system establishes a secure wireless communication link with the GPS enabled wireless phone.

3. The navigation system of claim 1, the processing circuitry of the GPS navigation system further configured to:
    transmit the GPS coordinates of the vehicle to the GPS enabled wireless phone upon detection of powering down of the vehicle.

4. The navigation system of claim 1, the processing circuitry of the GPS navigation system further configured to:
    receive a request from the GPS enabled wireless phone for the GPS coordinates of the vehicle; and
    transmit the GPS coordinates of the vehicle to the GPS enabled wireless phone in response to receipt of the request.

5. The navigation system of claim 1, the processing circuitry of the GPS navigation system further configured to:
    at least temporarily remove the device pairing after detecting a change in an operating state of the vehicle.

6. The navigation system of claim 1, wherein exchanging GPS information with the GPS enabled wireless phone comprises the GPS navigation system receiving a route including GPS coordinates from the GPS enabled wireless phone.

7. The navigation system of claim 1, wherein exchanging GPS information with the GPS enabled wireless phone comprises the GPS navigation system transmitting destination information, including GPS coordinates to the GPS enabled wireless phone.

8. The navigation system of claim 1, wherein exchanging GPS information with the GPS enabled wireless phone comprises the GPS navigation system receiving destination information, including GPS coordinates from the GPS enabled wireless phone.

9. The navigation system of claim 1, wherein communicative coupling between the GPS navigation system and the GPS enabled wireless phone services wireless communications that are relayed by a wireless network.

10. The navigation system of claim 1, wherein the processing circuitry is further operable to remove the device pairing after expiration of a time period.

11. The navigation system of claim 1, wherein exchanging GPS information with the GPS enabled wireless phone comprises:
    determining portions of an active route not yet completed; and
    transmitting the portions of the active route determined to be not yet completed to the GPS enabled wireless phone.

12. The navigation system of claim 1, the processing circuitry of the GPS navigation system further configured to download to the GPS enabled wireless phone one or more of pictures and traffic information relating to the GPS information.

13. The navigation system of claim 1, the processing circuitry of the GPS navigation system further configured to upload from the GPS enabled wireless phone traffic information relating to the GPS information.

14. A Global Positioning System (GPS) enabled wireless phone configured to interface with a GPS navigation system, the GPS enabled wireless phone comprising:
    a cellular wireless interface configured to be coupled to a cellular wireless communications network;
    a GPS receiver;
    a communications interface operable to communicatively couple to a communications interface of the GPS navigation system via a wireless personal area network (WPAN) protocol; and
    processing circuitry coupled to the GPS receiver and to the communications interface and configured to:
        establish device pairing with the GPS navigation system, individually;
        exchange GPS information with the GPS navigation system via the WPAN; and
    wherein the GPS enabled wireless phone is configured to:
        record, on the GPS enabled wireless phone, a location of the GPS enabled wireless phone in response to determining that direct communication with the GPS navigation system via the WPAN is lost.

15. The GPS enabled wireless phone of claim 14, wherein in establishing device pairing with the GPS navigation system the processing circuitry of the GPS enabled wireless phone establishes a secure wireless communication link with the GPS navigation system.

16. The GPS enabled wireless phone of claim 14:
    wherein the GPS navigation system physically couples to a vehicle and resides within the vehicle; and
    the processing circuitry of the GPS enabled wireless phone system is further configured to receive GPS coordinates of the vehicle from the GPS navigation system.

17. The GPS enabled wireless phone of claim 16, wherein the GPS coordinates of the vehicle are received from the GPS navigation system upon detection of powering down of the vehicle.

18. The GPS enabled wireless phone of claim 16, wherein the GPS coordinates of the vehicle are received from the GPS navigation system in response to a request transmitted from the GPS enabled wireless phone to the GPS navigation system.

19. The GPS enabled wireless phone of claim 16, wherein the GPS coordinates of the vehicle are received from the GPS navigation system in response to a detection of physical separation of the GPS enabled wireless phone and the GPS navigation system that exceeds a threshold wherein the threshold is determined based on a distance at which direct communication via the WPAN is lost.

20. The GPS enabled wireless phone of claim 16, wherein the processing circuitry is further operable to at least temporarily remove the device pairing after detection of powering down of a vehicle in which the navigation system is physically coupled.

21. The GPS enabled wireless phone of claim 14, wherein exchanging GPS information with the GPS navigation system comprises the GPS enabled wireless phone transmitting a route including GPS coordinates to the GPS navigation system.

22. The GPS enabled wireless phone of claim 14, wherein exchanging GPS information with the GPS navigation system comprises the GPS enabled wireless phone receiving a route including GPS coordinates from the GPS navigation system.

23. The GPS enabled wireless phone of claim 14, wherein exchanging GPS information with the GPS navigation system comprises the GPS enabled wireless phone transmitting destination information, including GPS coordinates to the GPS navigation system.

24. The GPS enabled wireless phone of claim 14, wherein exchanging GPS information with the GPS navigation system comprises the GPS enabled wireless phone receiving destination information, including GPS coordinates from the GPS navigation system.

25. The GPS enabled wireless phone of claim 14, wherein communicative coupling between the GPS navigation system and the GPS enabled wireless phone includes wireless communications that are relayed by a wireless network.

26. The GPS enabled wireless phone of claim 14, wherein communications between the GPS navigation system and the GPS enabled phone comply with a wireless network communication protocol standard.

27. The GPS enabled wireless phone of claim 14, wherein the processing circuitry is further configured to remove the device pairing after expiration of a time period.

28. The GPS enabled wireless phone of claim 14, wherein exchanging GPS information with the GPS navigation system comprises:
 determining portions of an active route not yet completed; and
 transmitting the portions of the active route not yet completed to the GPS navigation system.

29. The GPS enabled wireless phone of claim 14, wherein the processing circuitry further configured to upload to the GPS navigation system one or more of pictures, destination information, waypoint information, and traffic information relating to the GPS information.

30. The GPS enabled wireless phone of claim 14, wherein the processing circuitry further operable to upload from the GPS enabled wireless phone to the GPS navigation system one or more of pictures relating to the GPS information.

31. A navigation system supporting mounting within a vehicle, the navigation system having first geographical location data, the navigation system interacting with a mobile device that has second geographic location data, the mobile device being carried by a user both within and outside of the vehicle, the navigation system comprising:
 first communication interface circuitry;
 processing circuitry configured to securely communicate global positioning system (GPS) coordinates of the vehicle to the mobile device via the first communication interface circuitry;
 the processing circuitry configured to support handover of a navigation routing wherein at least a first portion of the navigation routing occurs via the navigation system and at least a second portion of the navigation routing occurs via the mobile device; and
 second communication interface circuitry; wherein the handover includes the processing circuitry communicating the GPS coordinates of the vehicle to the mobile device indirectly via the second communication circuitry in response to detecting loss of direct communication via the first communication circuitry.

\* \* \* \* \*